(12) United States Patent
Wan et al.

(10) Patent No.: US 12,145,067 B2
(45) Date of Patent: Nov. 19, 2024

(54) VIRTUAL OBJECT CONTROL METHOD AND APPARATUS IN VIRTUAL SCENE, DEVICE, AND STORAGE MEDIUM

(71) Applicant: Tencent Technology (Shenzhen) Company Limited, Guangdong (CN)

(72) Inventors: Yulin Wan, Shenzhen (CN); Jianmiao Weng, Shenzhen (CN); Xun Hu, Shenzhen (CN); Shandong Su, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 378 days.

(21) Appl. No.: 17/508,436

(22) Filed: Oct. 22, 2021

(65) Prior Publication Data

US 2022/0040582 A1    Feb. 10, 2022

Related U.S. Application Data

(63) Continuation of application No. PCT/CN2021/095072, filed on May 21, 2021.

(30) Foreign Application Priority Data

Jun. 5, 2020    (CN) .......................... 202010507412.X

(51) Int. Cl.
```
A63F 13/58     (2014.01)
A63F 13/56     (2014.01)
A63F 13/573    (2014.01)
```
(52) U.S. Cl.
CPC .............. *A63F 13/58* (2014.09); *A63F 13/56* (2014.09); *A63F 13/573* (2014.09)

(58) Field of Classification Search
CPC ........ A63F 13/58; A63F 13/56; A63F 13/573; A63F 13/837; A63F 13/5372; A63F 2300/8076

See application file for complete search history.

(56) References Cited

U.S. PATENT DOCUMENTS

2006/0258443 A1*  11/2006  Moro ................... A63F 13/2145
                                                         463/30
2009/0181736 A1*   7/2009  Haigh-Hutchinson .....................
                                                            A63F 13/55
                                                               463/2

(Continued)

FOREIGN PATENT DOCUMENTS

CN        102974098 A      3/2013
CN        106914019 A      7/2017

(Continued)

OTHER PUBLICATIONS

Singaporean Search Report and Written Opinion issued Mar. 10, 2023 in Application No. 11202111542V, 11 pages.

(Continued)

*Primary Examiner* — Chase E Leichliter

(74) *Attorney, Agent, or Firm* — ArentFox Schiff LLP

(57) ABSTRACT

A virtual object control method is described. The method includes determining a search range greater than a maximum shooting range of a target skill in a virtual scene corresponding to the target skill, in response to receiving an operation on a target skill control searching the determined search range for a target virtual object in the virtual scene, and controlling, when the target virtual object is found within the search range, and based on a position of the target virtual object in the virtual scene, a first virtual object to cast the target skill in the virtual scene. Apparatus and non-transitory computer-readable storage medium counterpart embodiments are provided.

20 Claims, 10 Drawing Sheets

(56) References Cited

U.S. PATENT DOCUMENTS

| | | | |
|---|---|---|---|
| 2016/0256777 A1* | 9/2016 | Umebayashi | A63F 13/00 |
| 2017/0291108 A1* | 10/2017 | Kim | A63F 13/525 |
| 2017/0340959 A1* | 11/2017 | Tang | A63F 13/426 |
| 2018/0008888 A1* | 1/2018 | Kim | A63F 13/825 |
| 2018/0339229 A1* | 11/2018 | He | G06F 3/04847 |
| 2020/0070049 A1* | 3/2020 | Yu | A63F 13/5372 |
| 2020/0282312 A1* | 9/2020 | Hu | A63F 13/58 |
| 2022/0040582 A1* | 2/2022 | Wan | A63F 13/5372 |

FOREIGN PATENT DOCUMENTS

| | | |
|---|---|---|
| CN | 107193479 A | 9/2017 |
| CN | 107441707 A | 12/2017 |
| CN | 108310772 A | 7/2018 |
| CN | 110064193 A | 7/2019 |
| CN | 110787450 A | 2/2020 |
| CN | 111672102 A | 9/2020 |

OTHER PUBLICATIONS

International Search Report & Written Opinion issued Aug. 23, 2021, in PCT/CN2021/095072, (11 pages).
Office Action issued May 31, 2021, in corresponding Chinese Patent Application No. 202010507412.X (with English translation), 13 pages.
Japanese Office Action issued Dec. 5, 2022 in Application No. 2021-564808 with English Translation, 11 pages.

* cited by examiner

VIRTUAL OBJECT CONTROL METHOD AND APPARATUS IN VIRTUAL SCENE, DEVICE, AND STORAGE MEDIUM

RELATED APPLICATIONS

This application is a continuation application of International Application No. PCT/CN2021/095072, entitled "VIRTUAL OBJECT CONTROL METHOD AND APPARATUS IN VIRTUAL SCENE, DEVICE, AND STORAGE MEDIUM," and filed on May 21, 2021, which claims priority to Chinese Patent Application No. 202010507412.X, entitled "VIRTUAL OBJECT CONTROL METHOD AND APPARATUS IN VIRTUAL SCENE, DEVICE, AND STORAGE MEDIUM," filed on Jun. 5, 2020. The entire disclosures of the above-identified prior applications are incorporated herein by reference in their entirety.

FIELD OF THE TECHNOLOGY

Embodiments of this disclosure relate to the field of virtual scene technologies, including a virtual object control method and apparatus in a virtual scene, a device, and a storage medium.

BACKGROUND OF THE DISCLOSURE

A battle game is a game in which a plurality of user accounts compete in the same scene. The battle game may be a multiplayer online battle arena (MOBA) game. In this game scene, game skills are widely used.

In a virtual scene such as a game scene, when controlling a virtual object to cast a skill, for some skills that need to determine casting directions or casting positions, a user may select a skill casting mode of quick casting. For example, for a skill that needs to determine a casting direction or a casting position, when selecting quick casting, the user may click an icon of the skill, and then a game program automatically selects a target object within a shooting range of the skill and casts the skill to the target object. However, sometimes a user incorrectly considers that a target object at an edge outside the maximum shooting range is within the maximum shooting range, and the user uses the skill casting mode of quick casting. In this case, the target object automatically selected by the game program may not be a target object that the user intends to cast the skill, which may affect the accuracy of casting the skill, affect the interaction efficiency when the virtual object is controlled, and waste the computing resources consumed for processing user operations and the computing resources when the skill is cast.

SUMMARY

Embodiments of this disclosure provide a virtual object control method and apparatus in a virtual scene, a device and a storage medium, and the technical solutions are as follows.

According to an aspect, an embodiment of this disclosure provides a virtual object control method in a virtual scene, including: (1) determining a first search range corresponding to a target skill, in response to receiving an operation on a target skill control, the first search range being greater than a maximum shooting range of the target skill in the virtual scene; (2) searching the determined first search range for a target virtual object in the virtual scene, the target virtual object being a virtual object actable on by the target skill; and (3) controlling, when the target virtual object is found within the first search range, and based on a position of the target virtual object in the virtual scene, a first virtual object to cast the target skill in the virtual scene.

According to another aspect, an embodiment of this disclosure further provides a virtual object control method in a virtual scene, including: (1) presenting a virtual scene interface, the virtual scene interface including a target skill control; (2) presenting a virtual scene interface, the virtual scene interface including a target skill control; (3) presenting a first scene screen in the virtual scene interface in response to receiving an operation on the target skill control, the first scene screen including a casting mode detection region, the casting mode detection region being a region having a starting point of the operation as a center, the starting point of the operation being an operating point at which the operation starts; and (4) presenting a second scene screen in the virtual scene interface when the operation ends, and an end point of the operation falls within the casting mode detection region, the second scene screen being a screen in which a first virtual object casts a target skill based on a position of a target virtual object, the end point of the operation being an operating point at a previous time point of the end of the operation, the target virtual object being a virtual object within a first search region, the first search region being a region having the first virtual object as a center, and the first search region being greater than a maximum shooting range of the target skill.

According to another aspect, an embodiment of this disclosure provides a virtual object control apparatus in a virtual scene, including: circuitry configured to (1) determine a first search range in a virtual scene corresponding to a target skill, in response to receiving an operation on a target skill control, the first search range being greater than a maximum shooting range of the target skill in the virtual scene; (2) search the determined first search range for a target virtual object in the virtual scene, the target virtual object being a virtual object actable on the target skill; and (3) control, when the target virtual object is found within the first search range, and based on a position of the target virtual object in the virtual scene, a first virtual object to cast the target skill in the virtual scene.

In addition, an embodiment of this disclosure provides a computer device, including a processor (processing circuitry) and a memory, the memory storing at least one instruction, at least one program, a code set, or an instruction set, the at least one instruction, the at least one program, the code set, or the instruction set being loaded and executed by the processor (processing circuitry) to implement the foregoing virtual object control method in a virtual scene.

According to another aspect, an embodiment of this disclosure further provides a non-transitory computer-readable storage medium, storing at least one instruction, at least one program, a code set, or an instruction set, and the at least one instruction, the at least one program, the code set, or the instruction set being loaded and executed by processing circuitry to implement the foregoing virtual object control method in a virtual scene.

It is to be understood that the foregoing general descriptions and the following detailed descriptions are merely for exemplary and explanatory purposes and are not intended to limit this disclosure.

BRIEF DESCRIPTION OF THE DRAWINGS

Accompanying drawings herein are incorporated into a specification and constitute a part of this specification, show embodiments that conform to this disclosure, and are used for describing a principle of this disclosure together with this specification.

DESCRIPTION OF EMBODIMENTS

Figure 1:
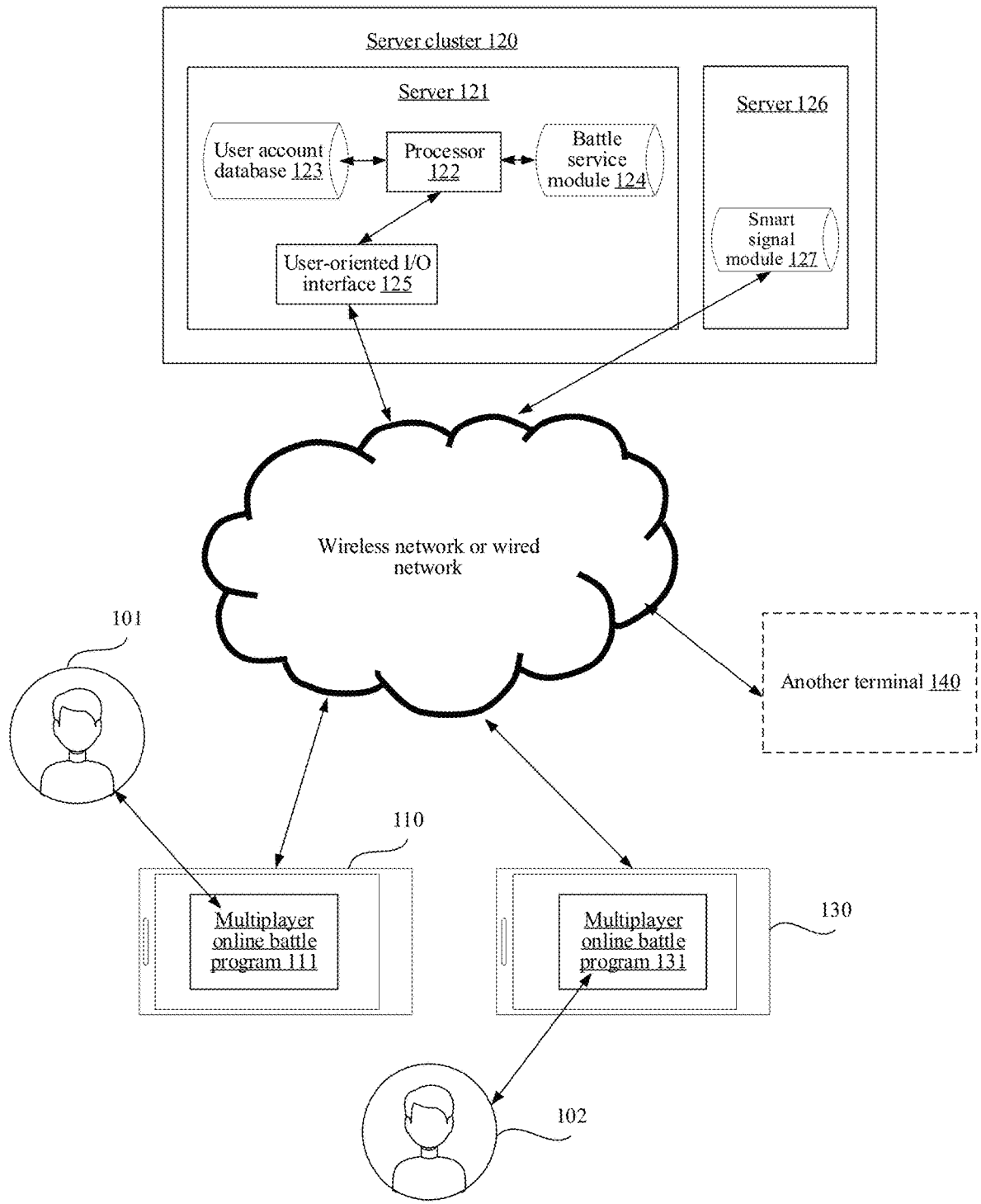
FIG. 1 is a structural block diagram of a computer system according to an exemplary embodiment of this disclosure.

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations that are consistent with this disclosure. On the contrary, the implementations are merely examples of apparatuses and methods that are described in detail in the appended claims and that are consistent with some aspects of this disclosure.

In the virtual scene, to improve the efficiency of casting a skill on a target object by a virtual object controlled by a user, a quick casting function of the skill is set. When the target object is within a maximum shooting range of the skill, and the user selects the quick casting function, a game program may automatically select, in response to this selection, a target object within the maximum shooting range and cast the skill to the target object. However, a case that the user incorrectly considers that a target object at an edge outside the maximum shooting range is within the maximum shooting range, and uses a skill casting mode of quick casting may appear. In this case, the target object automatically selected by the game program may not be a target object that the user intends to cast the skill, which may affect the accuracy of casting the skill, affect the interaction efficiency when the virtual object is controlled, and waste the computing resources consumed for processing user operations and the computing resources when the skill is cast. To reduce an impact on the skill accuracy caused because the user incorrectly considers that target object is within the maximum shooting range and uses the quick casting, an embodiment of this disclosure provides a virtual object control method in a virtual scene, to improve the accuracy of casting the skill on the target object in a virtual scene and save the computing resources when the target object is at an edge of the maximum shooting range. For convenience of understanding, terms in the embodiments of this disclosure are described.

(1) Virtual Scene

Virtual scene: a virtual scene displayed (or provided) by an application program when run on a terminal. The virtual scene may be a simulated environment scene of a real world, or may be a semi-simulated semi-fictional three-dimensional (3D) environment scene, or may be an entirely fictional 3D environment scene. The virtual scene may be any one of a two-dimensional (2D) virtual scene, a 2.5-dimensional virtual scene, and a 3D virtual scene, and description is made by using an example in which the virtual scene is a 3D virtual scene in the following embodiments, but this is not limited. In an embodiment, the virtual scene is further used for a virtual scene battle between at least two virtual characters. In an embodiment, there are virtual resources available to the at least two virtual characters in the virtual scene. In an embodiment, the virtual scene includes a square map. The square map includes a lower left corner region and an upper right corner region that are symmetrical. Virtual characters on two opposing camps occupy the regions respectively, and an objective of each side is to destroy a target building/fort/base/crystal deep in an opponent's region to win victory.

(2) Virtual Object

Virtual object: a movable object in a virtual scene. The movable object may be at least one of a virtual character, a virtual animal, and a cartoon character. In an embodiment, when the virtual scene is a 3D virtual scene, the virtual object may be a 3D model. Each virtual object has a shape and a volume in the 3D virtual scene, and occupies some space in the 3D virtual scene. In an embodiment, the virtual character is a 3D character constructed based on 3D human skeleton technology. The virtual character wears different skins to implement different appearances. In some implementations, the virtual character may be alternatively implemented by using a 2.5-dimensional model or a 2D model. This is not limited in this embodiment of this disclosure.

(3) MOBA

A MOBA is an arena in which different virtual teams on at least two opposing camps occupy respective map regions in a map provided in the virtual scene, and compete against each other using a specific victory condition as an objective. The victory conditions include, but are not limited to at least one of occupying forts or destroying forts of an opposing camp, killing virtual characters in the opposing camp, ensuring own survival in a specified scene and time, seizing a specific resource, or outscoring an opponent within a specified time. The battle arena may take place in rounds, and each round of the battle arena may have the same map or different maps. Each virtual team includes one or more virtual characters, for example, 1 virtual character, 3 virtual characters, or 5 virtual characters.

(4) MOBA Game

MOBA game: a game in which several forts are provided in a virtual scene, and users on different camps control virtual characters to battle in the virtual scene, occupy forts or destroy forts of an opposing camp. For example, in the MOBA game, the users may be divided into two opposing camps. The virtual characters controlled by the users are scattered in the virtual scene to compete against each other, and the victory condition is to destroy or occupy all enemy forts. The MOBA game takes place in rounds, and a duration of one round of the MOBA game is from a moment at which the game starts to a movement at which the victory condition is met.

FIG. 1 is a structural block diagram of a computer system according to an exemplary embodiment of this disclosure. The computer system 100 includes a first terminal 110, a server cluster 120, and a second terminal 130.

A client 111 supporting a virtual scene is installed and run on the first terminal 110, and the client 111 may be a multiplayer online battle program. When the first terminal runs the client 111, a user interface (UI) of the client 111 is displayed on a screen of the first terminal 110. The client may be any one of a military simulation program, a MOBA game, an escape shooting game, and a simulation game (SLG). In this embodiment, an example in which the client is a MOBA game is used for description. The first terminal 110 is a terminal used by a first user 101. The first user 101 uses the first terminal 110 to control a first virtual character located in the virtual scene to perform activities, and the first virtual character may be referred to as a master virtual character of the first user 101. The activities of the first virtual character include, but are not limited to, at least one of adjusting a body posture, crawling, walking, running, riding, flying, jumping, driving, picking, shooting, attacking, and throwing. For example, the first virtual character is a first virtual character, for example, a simulated person character or a cartoon person character.

A client 131 supporting the virtual scene is installed and run on the second terminal 130, and the client 131 may be a multiplayer online battle program. When the second terminal 130 runs the client 131, a UI of the client 131 is displayed on a screen of the second terminal 130. The client may be any one of a military simulation program, a MOBA game, an escape shooting game, and an SLG game. In this embodiment, an example in which the client is a MOBA game is used for description. The second terminal 130 is a terminal used by a second user 102. The second user 102 uses the second terminal 130 to control a second virtual character located in the virtual scene to perform activities, and the second virtual character may be referred to as a master virtual character of the second user 102. For example, the second virtual character is a second virtual character, for example, a simulated person character or a cartoon person character.

In an embodiment, the first virtual character and the second virtual character are located in the same virtual scene. In an embodiment, the first virtual character and the second virtual character may belong to the same camp, the same team, or the same organization, have a friend relationship, or have a temporary communication permission. In an embodiment, the first virtual character and the second virtual character may belong to different camps, different teams, or different organizations, or have a hostile relationship with each other.

In an embodiment, the client installed on the first terminal 110 is the same as the client installed on the second terminal 130, or the clients installed on the two terminals are the same type of clients of different operating system platforms (Android system or iOS system). The first terminal 110 may generally refer to one of a plurality of terminals, and the second terminal 130 may generally refer to another one of a plurality of terminals. In this embodiment, only the first terminal 110 and the second terminal 130 are used as an example for description. The first terminal 110 and the second terminal 130 are of the same or different device types. The device type includes at least one of a smartphone, a tablet computer, an e-book reader, an MP3 player, an MP4 player, a laptop, and a desktop computer.

FIG. 1 shows only two terminals. However, a plurality of other terminals 140 may access the server cluster 120 in different embodiments. In an embodiment, alternatively, one or more terminals 140 are terminals corresponding to a developer. A platform for developing and editing the client of a virtual scene is installed on the terminal 140. The developer may edit and update the client on the terminal 140 and transmit an updated client installation package to the server cluster 120 by using a wired or wireless network. The first terminal 110 and the second terminal 130 may download the client installation package from the server cluster 120 to update the client.

The first terminal 110, the second terminal 130, and the other terminals 140 are connected to the server cluster 120 by a wireless network or a wired network.

The server cluster 120 includes at least one of one independent physical server, a plurality of independent physical servers, a cloud server that provides cloud computing services, a cloud computing platform, and a virtualization center. The server cluster 120 is configured to provide a backend service for a client supporting a 3D virtual scene. In an embodiment, the server cluster 120 takes on primary computing work, and the terminals take on secondary computing work; or the server cluster 120 takes on the secondary computing work, and the terminals take on the primary computing work; or collaborative computing is performed by using a distributed computing architecture between the server cluster 120 and the terminals.

In an exemplary example, the server cluster 120 includes a server 121 and a server 126. The server 121 includes a processor 122, a user account database 123, a battle service module 124, and a user-oriented input/output (I/O) interface 125. The processor 122 is configured to load instructions stored in the server 121, and process data in the user account database 121 and the battle service module 124. The user account database 121 is used for storing data of user accounts used by the first terminal 110, the second terminal 130, and/or the other terminals 140, for example, avatars of the user accounts, nicknames of the user accounts, battle effectiveness indexes of the user accounts, and service regions in which the user accounts are located. The battle service module 124 is configured to provide a plurality of battle rooms for the users to battle, for example, a 1V1 battle room, a 3V3 battle room, and a 5V5 battle room. The user-oriented I/O interface 125 is configured to establish communication with the first terminal 110 and/or the second terminal 130 by using a wireless network or wired network for data exchange. In an embodiment, a smart signal module 127 is disposed inside the server 126, and the smart signal module 127 is configured to implement the virtual object control method in a virtual scene provided in the following embodiments.

Figure 2:
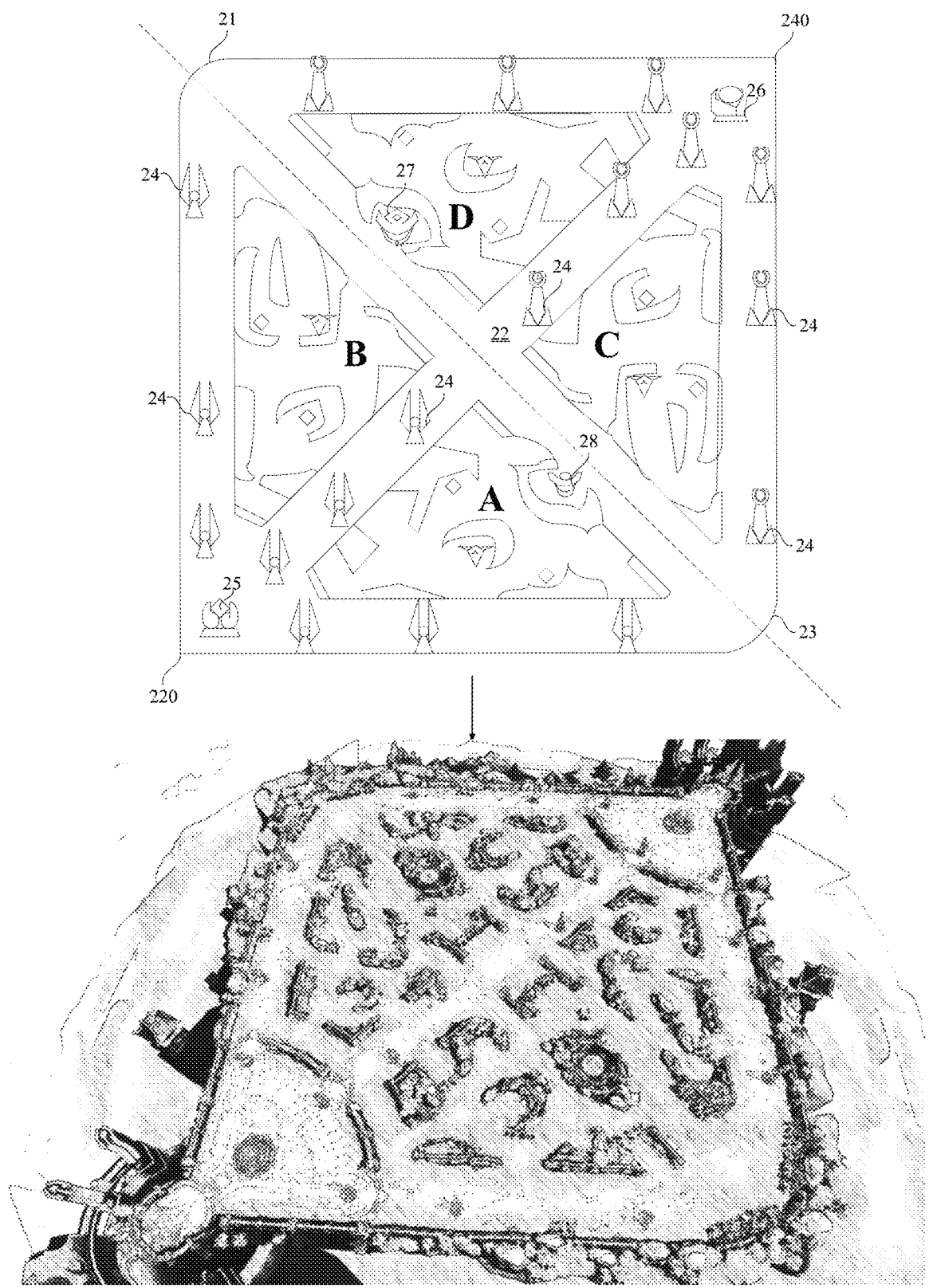
FIG. 2 is a schematic diagram of a map provided in a virtual scene of a MOBA game according to an exemplary embodiment of this disclosure.

FIG. 2 is a schematic diagram of a map provided in a virtual scene of a MOBA game according to an exemplary embodiment of this disclosure. The map 200 is in a square. The map 200 is divided diagonally into a lower left triangle region 220 and an upper right triangle region 240. There are three lanes from a lower left corner of the lower left triangle region 220 to an upper right corner of the upper right triangle region 240: a top lane 21, a middle lane 22, and a bottom lane 23.

In a typical round of battle, ten virtual characters are divided into two camps to battle. Five virtual characters in a first camp occupy the lower left triangle region 220, and five virtual characters in a second camp occupy the upper right triangle region 240. The first camp seeks the destruction or occupation of all forts of the second camp as a victory condition, and the second camp seeks the destruction or occupation of all forts of the first camp as a victory condition.

For example, the forts of the first camp include nine turrets 24 and a first base 25. Among the nine turrets 24, there are respectively three turrets on the top lane 21, the middle lane 22, and the bottom lane 23. The first base 25 is located at the lower left corner of the lower left triangle region 220.

For example, the forts of the second camp include nine turrets 24 and a second base 26. Among the nine turrets 24, there are respectively three turrets on the top lane 21, the middle lane 22, and the bottom lane 23. The second base 26 is located at the upper right corner of the upper right triangle region 220.

A location of a dotted line in FIG. 2 may be referred to as a riverway region. The riverway region is a common region of the first camp and the second camp, and is also a border region of the lower left triangle region 220 and the upper right triangle region 240.

The MOBA game allows the virtual characters to obtain resources in the map 200 to improve combat capabilities of the virtual characters. The resources include the following 1. Creeps that periodically appear on the top lane 21, the middle lane 22, and the bottom lane 23, and when the creeps are killed, nearby virtual characters obtain experience values and gold coins.

2. The map may be divided into four triangle regions A, B, C, and D by using the middle lane (a diagonal line from the lower left corner to the upper right corner) and the riverway region (a diagonal line from an upper left corner to a lower right corner) as cutting lines. Monsters are periodically refreshed in the four triangle regions A, B, C, and D, and when the monsters are killed, nearby virtual characters obtain experience values, gold coins, and BUFF effects.

3. A big dragon 27 and a small dragon 28 are periodically refreshed in two symmetric positions in the riverway region. When the big dragon 27 and the small dragon 28 are killed, each virtual character in a killer camp obtains experience values, gold coins, and BUFF effects.

The combat capabilities of the ten virtual characters include two parts: level and equipment. The level is obtained by using accumulated experience values, and the equipment is purchased by using accumulated gold coins. The ten virtual characters may be obtained by matching ten user accounts online by a server. For example, the server matches an interface online in which two, six, or ten user accounts perform competition in the same virtual interface. The two, six, or ten virtual characters are on two opposing camps. The two camps have the same quantity of corresponding virtual characters. For example, there are five virtual characters on each camp. Types of the five virtual characters may be a warrior character, an assassin character, a mage character, a support (or meat shield) character, and an archer character respectively.

The foregoing battle may take place in rounds, and each round of the battle may have the same map or different maps. Each camp includes one or more virtual characters, for example, one virtual character, three virtual characters, or five virtual characters.

Figure 3:
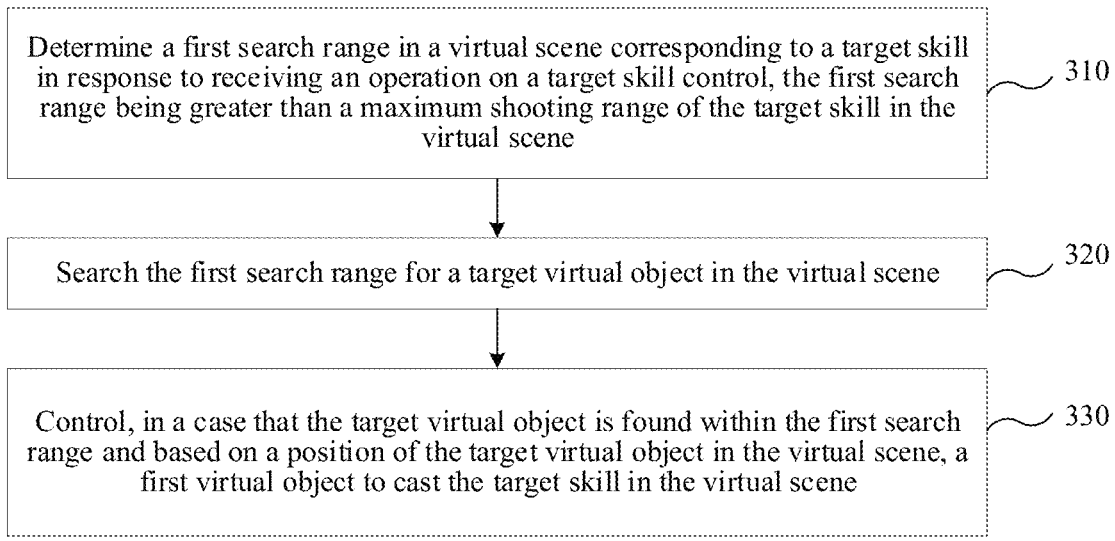
FIG. 3 is a flowchart of a virtual object control method in a virtual scene according to an exemplary embodiment of this disclosure.

FIG. 3 is a flowchart of a virtual object control method in a virtual scene according to an exemplary embodiment of this disclosure. The virtual object control method in a virtual scene may be performed by a computer device. The computer device may be implemented as a terminal or a server, where the terminal may be the terminal shown in FIG. 1, and the server may be the server shown in FIG. 1. As shown in FIG. 3, the virtual object control method in a virtual scene includes the following steps:

In Step 310, a first search range in a virtual scene corresponding to a target skill is determined in response to receiving an operation on a target skill control, the first search range being greater than a maximum shooting range of the target skill in the virtual scene.

In one implementation, the target skill control is used for triggering and/or controlling the target skill. The target skill control may be a control on a game UI. The target skill may be a target skill used by a first virtual object.

In one implementation, operations on the target skill control include at least one of a touch operation and an external device operation, the external device operation being a mouse click operation, a joystick control operation, or the like.

In one implementation, the target skill corresponds to a maximum shooting range, and the maximum shooting range may be determined according to parameter values of the maximum shooting range corresponding to the target skill. After being cast, the target skill may affect attribute values of specified attributes of one or more virtual objects within the maximum shooting range in a virtual environment. For example, in a game scene, health points of one or more virtual objects within the maximum shooting range are deducted, or action values of one or more virtual objects within the maximum shooting range are reduced, or health points of one or more virtual objects within the maximum shooting range are increased, or defense values of one or more virtual objects within the maximum shooting range are increased. Acting objects and an effect on the virtual object of the target skill are determined by an effect of the target skill.

Generally, when the target skill is triggered, the target skill cannot affect a virtual object outside the maximum shooting range of the target skill. Therefore, during quick casting of the target skill, the maximum shooting range of the target skill is determined as a search range of the computer device to automatically search for a target virtual object. However, in one implementation, because the target skill has a specific action range, or the first virtual object that casts the target skill moves toward a position of the target virtual object when casting the target skill, or the virtual object actable by the target skill moves toward the first virtual object that casts the target skill when the first virtual object casts the target skill, the virtual object may be within an action range of a target prop that is used by the first virtual object and that corresponds to the target skill, or the virtual object may enter a shooting range of a target prop, and the target prop may affect the virtual object. Therefore, to ensure the accuracy of obtaining a virtual object at a shooting edge of the target prop during use of the target prop, in this embodiment, when determining a first search range corresponding to the target skill, the computer device expands the maximum shooting range of the target skill by a specific search range, so that the computer device can obtain the virtual object at the shooting edge of the target skill, and avoid a case that the user considers through unaided viewing that the virtual object is within the shooting range of the target skill, but actually is not within the shooting range of the target skill, and the target skill cannot accurately act on the virtual object when being cast.

In Step 320, the first search range is searched for a target virtual object in the virtual scene, the target virtual object being a virtual object actable by the target skill.

In one implementation, the target virtual object is used for instructing the computer device to determine a casting direction or a casting position of the target skill. That is, in one case, the target skill is a skill that can simultaneously affect a plurality of virtual objects. However, during casting, the computer device needs to determine the casting of the target skill by using one target virtual object, for example, to determine a casting direction, a casting position, or the like of the target skill.

In one implementation, there is at least one virtual object within the first search range, and the at least one virtual object may include virtual objects on a camp the same as that of the first virtual object that casts the target prop or virtual objects on a camp different from that of the first virtual object. If the action effect in response to the target skill is to play a role on the virtual objects on the camp the same as that of the first virtual object, the target virtual object is one of the virtual objects on the camp the same as that of the first virtual object within the first search range. For example, when the target skill is a healing skill, and may add specific health points to the target virtual object on the same camp, the target virtual object is one of the virtual objects on the same camp within the first search region. If the action effect in response to the target skill is to play a role on the virtual objects on the camp different from that of the first virtual object, the target virtual object is one of the virtual objects on the camp different from that of the first virtual object within the first search range. For example, when the target skill is a damage skill, and may cause damage to the target virtual object on the different camp, the target virtual object being one of the virtual objects on the different camp within the first search region.

In Step 330, the target virtual object is found within the first search range, and based on a position of the target virtual object in the virtual scene, a first virtual object is controlled to cast the target skill in the virtual scene.

In one implementation, the controlling, based on a position of the target virtual object in the virtual scene, a first virtual object to cast the target skill in the virtual scene may be implemented as follows: (1) determining a casting direction of the target skill according to a directional relationship between the position of the target virtual object and a position of the first virtual object, and controlling, according to the casting direction, the first virtual object to cast the target skill; or (2) determining a casting point of the target skill according to the position of the target virtual object, and controlling, by using the casting point as a target, the first virtual object to cast the target skill.

In summary, by using the virtual object control method in a virtual scene shown in the embodiments of this disclosure, when a target skill is cast, a maximum shooting range of the target skill is expanded by a specific search range, an expanded search range is searched for a target virtual object, and a virtual object is controlled, according to a position of the target virtual object, to cast the target skill, so that when the user controls the first virtual object to use the target skill, the computer device (circuitry) can obtain a virtual object at a maximum shooting edge of the target skill, and cast the target skill on the obtained virtual object, which reduces user operations required in a process of using the skill to aim at such a virtual object, thereby improving the accuracy of casting the skill in the virtual scene and the interaction efficiency when the virtual object is controlled, and saving the computing resources consumed for processing the user operations and the computing resources consumed for casting the target skill in a virtual environment.

In one implementation, the target skill has a quick casting mode and an active aiming mode. The quick casting mode means that when an end point of the operation based on the target skill control falls within the casting mode detection region, the target skill is quickly triggered, and the computer device automatically aims at the virtual object according to a preset target search rule, and casts the target skill in an aimed direction or position, thereby achieving the effect of quickly casting the target skill. The active aiming mode means that when the end point of the operation based on the target skill control is out of the casting mode detection region, the determining a casting direction or a casting position of the target skill according to the operation of the user on the target skill control includes mapping a starting point of an operation performed by the user on the target skill control and the end point of the operation to a 3D scene. The active aiming mode may also be referred to as a manual aiming mode. The starting point of the operation corresponds to the position of the first virtual object in the virtual scene. A position of a mapping point in the virtual scene corresponding to the end point of the operation is determined in the virtual scene according to the position of the first virtual object in the virtual scene. The computer device determines candidate virtual objects within a search region using the mapping point as a center and R as a radius, and casts the target skill in a direction or position of a target virtual object when the user determines the target virtual object from the candidate virtual objects.

Figure 4:
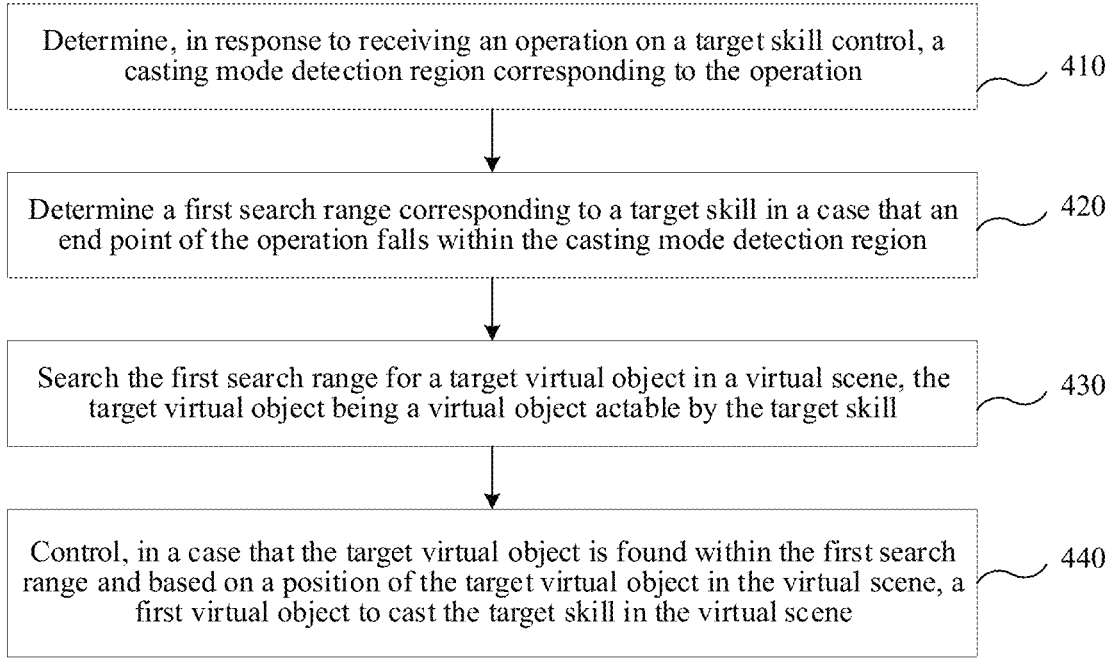
FIG. 4 is a flowchart of a virtual object control method in a virtual scene according to an exemplary embodiment of this disclosure.

An example in which the target skill is triggered and cast in the quick casting mode is used. FIG. 4 is a flowchart of a virtual object control method in a virtual scene according to an exemplary embodiment of this disclosure. The virtual object control method in a virtual scene may be performed by a computer device. The computer device may be implemented as a terminal or a server, where the terminal may be the terminal shown in FIG. 1, and the server may be the server shown in FIG. 1. As shown in FIG. 4, the virtual object control method in a virtual scene includes the following steps.

In Step 410, in response to receiving an operation on a target skill control, a casting mode detection region corresponding to the operation is determined.

The casting mode detection region is a region using a starting point of an operation as a center, and the starting point of the operation is an operating point at which the operation on the target skill control starts.

Figure 5:
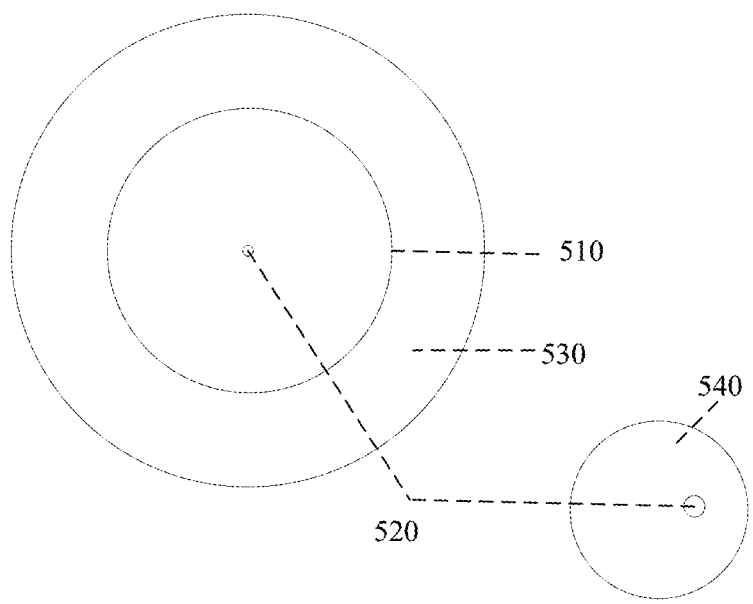
FIG. 5 is a schematic diagram of a casting mode detection region according to an exemplary embodiment of this disclosure.

In one implementation, the starting point at which the user performs the operation based on the target skill control to trigger the target skill is any point on the target skill control. A casting mode detection region is constructed by using the starting point of the operation as a center. FIG. 5 is a schematic diagram of a casting mode detection region according to an exemplary embodiment of this disclosure. As shown in FIG. 5, the casting mode detection region 510 is constructed by using an operating point 520 at which an operation performed by the user on a target skill control 540 starts as a center. A region 530 is a region outside the casting mode detection region. A quick casting mode of the target skill is triggered when an end point of the operation falls within the casting mode detection region. An active aiming mode of the target skill is triggered when the end point of the operation is out of the casting mode detection region. In a possible implementation, the casting mode detection region is a central region of the target skill control, and the computer device detects a starting point at which the user performs an operation in the central region.

In Step 420, a first search range corresponding to a target skill is determined when an end point of the operation falls within the casting mode detection region.

The end point of the operation is an operating point on the target skill control at a previous time point of the end of the operation on the target skill control.

In one implementation, the step of determining the first search range corresponding to the target skill is implemented in the following steps:

First, the maximum shooting range of the target skill in the virtual scene is determined in response to receiving the operation on the target skill control.

In one implementation, different target skills correspond to different maximum shooting ranges.

In one implementation, the maximum shooting range of the target skill is a circular region formed by using a position of the first virtual object that casts the target skill as a center and r as a radius. Therefore, different maximum shooting ranges corresponding to different target skills represent different action radii r corresponding to different target skills.

Second, an action radius of the target skill is obtained.

Third, a specified search range is determined based on the action radius of the target skill.

In one implementation, different target skills correspond to different skill casting types, and target skills of different skill casting types correspond to different specified search ranges. The specified search range is used for determining a size of the first search range.

In the foregoing case, when the specified search range is determined, the following is performed: (1) obtaining a skill casting type of the target skill, the skill casting type including: casting in a specified direction, or casting in a specified position; and (2) determining the specified search range based on the skill casting type of the target skill.

The skill casting type is a target skill cast in a specified direction. When being cast in the virtual scene, the target skill can have a corresponding action effect on all actable virtual objects within the maximum shooting range of the target skill in the casting direction of the target skill, but according to distances between different actable virtual objects and the virtual object that casts the target skill, different degrees of impacts on different actable virtual objects may be produced. Generally, a shorter distance of the actable virtual object from the virtual object that casts the target skill indicates a better effect of an action effect of a target prop on the actable virtual object. The skill casting type is a target skill cast in a specified position. When being cast in the virtual scene, the target skill can have a corresponding action effect on actable virtual objects within a specific range that uses a casting position of the target skill as a center. Different target skills may have different action ranges, and according to distances of different actable virtual objects from the casting position of the target skill, different degrees of impacts on different actable virtual objects may be produced.

In one implementation, the skill casting types of different target skills have different requirements for search ranges that need to be expanded. For example, an action range of a skill cast based on the position is generally large, and therefore a relatively large specified search range may be set, while an action range of a skill cast based on the direction is generally small, and therefore a relatively small specified search range may be set.

In one implementation, the determining the specified search range based on the action radius of the target skill is increasing a radius value based on the action radius of the target skill. A value for expanding a radius corresponding to each target skill is set by the computer device, or is set by the user.

Fourth, the maximum shooting range is expanded by a specified search range, to obtain the first search range.

In one implementation, different target skills correspond to different skill casting types, and target skills of different skill casting types correspond to different specified search ranges.

In one implementation, a position of the first virtual object in the virtual scene is determined when the end point of the operation on the target skill control falls within the casting mode detection region; and a search range obtained after the maximum shooting range is expanded by a specified search range is determined as the first search range by using the position of the first virtual object in the virtual scene as a center.

Figure 6:
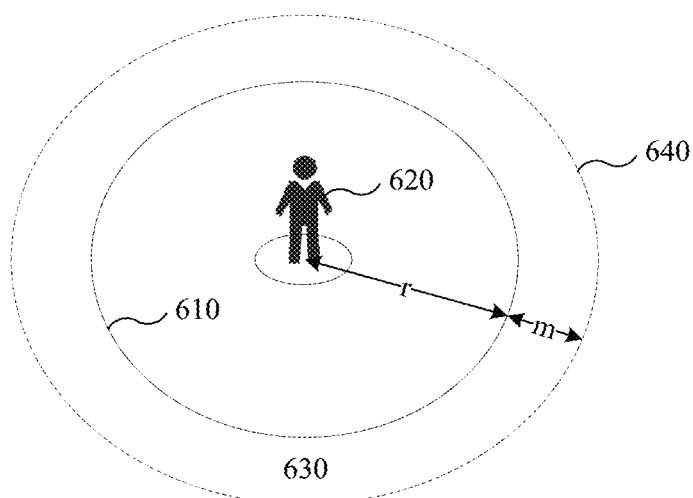
FIG. 6 is a schematic diagram of a search range according to an exemplary embodiment of this disclosure.

FIG. 6 is a schematic diagram of a search range according to an exemplary embodiment of this disclosure. As shown in FIG. 6, a maximum shooting range 610 corresponding to a target skill is a circular region formed by using a position of a first virtual object 620 as a center and r as a radius. The radius is increased by m (a specified search range) based on the maximum shooting range 610, to form an annular region 630. The maximum shooting range 610 and the annular region 630 jointly form a first search range 640 by using the position of the first virtual object 620 as a center and (r+m) as a radius. A value of m is set by the computer device, or is set by the user.

In one implementation, when the specified search range is determined through user setting, an expandable radius threshold is set. That is, the first search range cannot be expanded indefinitely. For example, using the foregoing first search region as an example, the value of m by which the radius is increased has an upper limit, that is, $0 \leq m \leq m_{thre}$, where $m_{thre}$ is the expandable radius threshold.

An example in which a shooting range of the target skill is a circular region formed by using the position of the virtual object that casts the target skill as a center and a preset length as a radius is used in this disclosure, to describe the virtual object control method in a virtual scene provided in this disclosure. A division manner of the shooting range of the target skill is not limited in this disclosure.

In Step 430, the first search range is searched for a target virtual object in the virtual scene, the target virtual object being a virtual object actable by the target skill.

In one implementation, the target virtual object is a virtual object that is within the first search range and that meets a preset condition, the preset condition being set based on the target skill.

In one implementation, acting objects of the target skill are virtual objects on a camp the same as that of the first virtual object, or acting objects of the target skill are virtual objects on a camp different from that of the first virtual object.

In one implementation, the searching the first search range for a target virtual object is implemented as follows.

Figure 7:
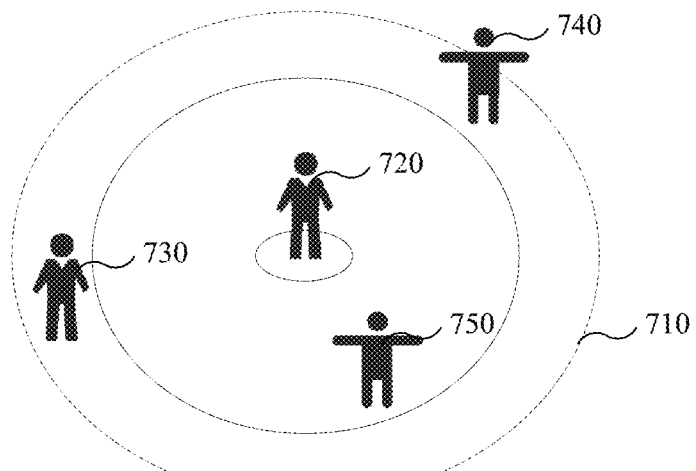
FIG. 7 is a schematic diagram of selecting a candidate virtual object according to an exemplary embodiment of this disclosure.

Candidate virtual objects within the first search range are determined based on the acting objects of the target skill, the candidate virtual objects being virtual objects of the acting objects of the target skill within the first search range. FIG. 7 is a schematic diagram of selecting a candidate virtual object according to an exemplary embodiment of this disclosure. As shown in FIG. 7, there are a first virtual object 720, a virtual object 730, a virtual object 740, and a virtual object 750 in a first search region 710, the first virtual object 720 and the virtual object 730 being of the same camp, and the virtual object 740 and the virtual object 750 being of another camp different from that of the first virtual object 720. If an acting object of a target prop used by the first virtual object is a virtual object of a camp the same as that of the first virtual object 720, in FIG. 7, the candidate virtual object is the virtual object 730; and if the acting objects of the target prop are virtual objects of a camp different from that of the first virtual object 720, in FIG. 7, the candidate virtual objects are the virtual object 740 and the virtual object 750.

The candidate virtual objects are searched for a target virtual object based on the preset condition.

In one implementation, the searching the candidate virtual objects for a target virtual object when at least two candidate virtual objects are within the first search region includes: (1) obtaining target values corresponding to the candidate virtual objects based on the preset condition; (2) performing priority sorting on the candidate virtual objects according to the obtained target values corresponding to the candidate virtual objects, to obtain a priority sorting result; and (3) determining a particular candidate virtual object with a highest priority in the priority sorting result as the target virtual object.

Figure 8:
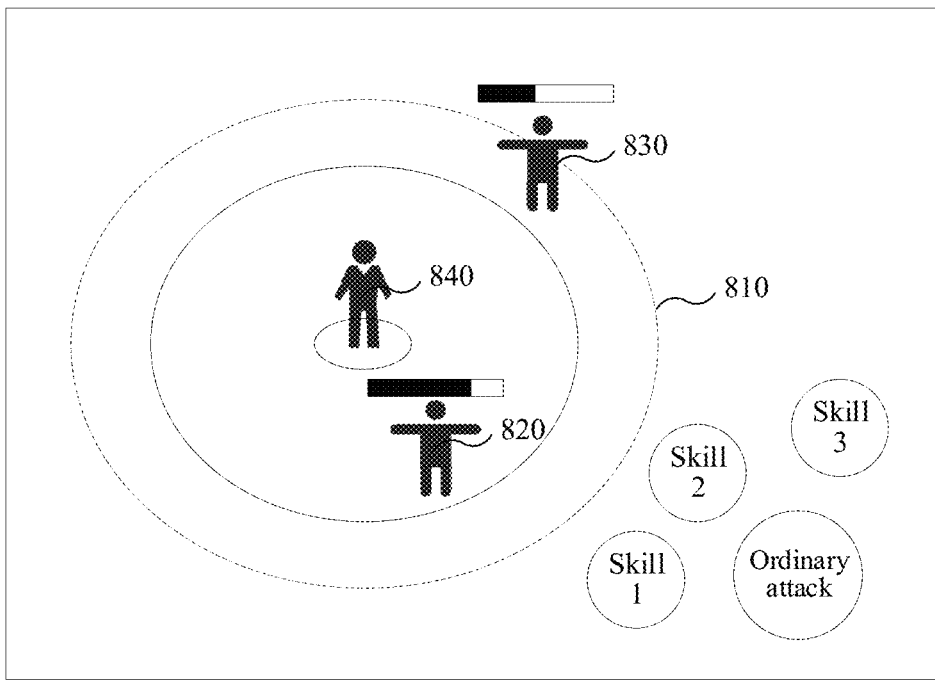
FIG. 8 is a schematic diagram of selecting a target virtual object according to an exemplary embodiment of this disclosure.

In one implementation, different target skills correspond to different preset conditions. For example, a preset condition corresponding to a target skill 1 is to determine a target virtual object according to distances between the candidate virtual objects and the first virtual object. FIG. 8 is a schematic diagram of selecting a target virtual object according to an exemplary embodiment of this disclosure. As shown in FIG. 8, there are a candidate virtual object 820 and a candidate virtual object 830 in a first search region 810, where a distance between the candidate virtual object 820 and a first virtual object 840 is less than a distance between the candidate virtual object 830 and the first virtual object 840. If a preset condition corresponding to the target skill is to determine a candidate virtual object that has a shortest distance from the first virtual object within the first search range as a target virtual object, the target skill 1 determines the candidate virtual object 820 as the target virtual object in FIG. 8. Alternatively, for example, a preset condition corresponding to a target skill 2 is to determine a target virtual object according to attribute values of specified attributes of candidate virtual objects. Using the specified attribute is health points as an example, as shown in FIG. 8, health points of the candidate virtual object 820 are higher than health points of the candidate virtual object 830. If a preset condition corresponding to the target skill is to obtain a candidate virtual object with the lowest health points of the candidate virtual objects within the first search range as the target virtual object, the target skill 2 determines the candidate virtual object 830 as the target virtual object in FIG. 8.

In Step 440, when the target virtual object is found within the first search range, and based on a position of the target virtual object in the virtual scene, control a first virtual object to cast the target skill in the virtual scene.

In one implementation, when the skill casting type of the target skill is casting in a specified direction, after the target virtual object is found within the first search range, a target direction of the target virtual object relative to the first virtual object in the virtual scene is determined; and the target skill is cast in the target direction.

In one implementation, when the skill casting type of the target skill is casting in the specified position, and the target virtual object is outside the maximum shooting range of the target skill but is within the first search range, after the target virtual object is found within the first search range, a first position and a second position are determined, the first position being a position of the first virtual object, the second position being the position of the target virtual object; and an intersection of a connecting line between the first position and the second position and the maximum shooting range corresponding to the target skill is determined; and the first virtual object is controlled to cast the target skill on the intersection.

Figure 9:
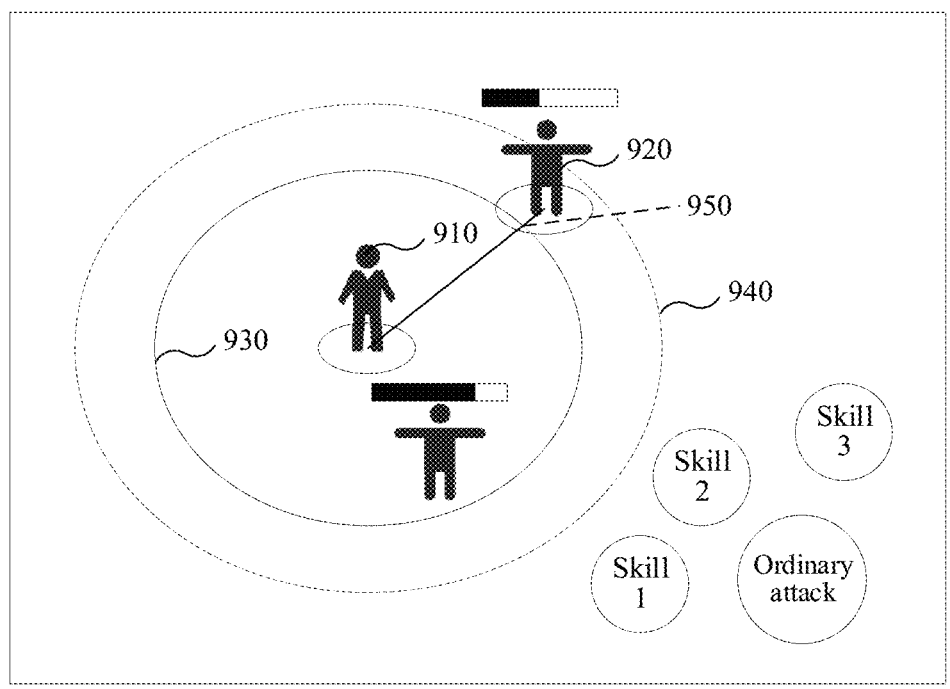
FIG. 9 is a schematic diagram of obtaining an action position of a target prop according to an exemplary embodiment of this disclosure.

FIG. 9 is a schematic diagram of obtaining an action position of a target prop according to an exemplary embodiment of this disclosure. As shown in FIG. 9, there are a first virtual object 910 and a target virtual object 920 in a virtual scene, the target virtual object 920 being outside a maximum shooting range 930 of a target skill used by the first virtual object 910, but being within a first search range 940. When obtaining the target virtual object, the computer device determines a position of the first virtual object 910 and a position of the target virtual object 920, and an intersection 950 of a connecting line that connects the two positions and a maximum shooting range 930 of the target skill, determines the intersection 950 as the action position of the target prop, and casts the target skill on the action position.

In one implementation, the casting of the target skill is canceled when no target virtual object is within the first search range.

When the computer device receives an operation on the target skill control, and searches the determined first search range for the target virtual object, but fails to find the target virtual object, to ensure the accuracy and effectiveness of casting the target skill, the quick casting of the target skill is canceled. In one case, the foregoing case is determined as an erroneous touch phenomenon.

In summary, by using the virtual object control method in a virtual scene shown in the embodiments of this disclosure, when a target skill is cast, a maximum shooting range of the target skill is expanded by a specific search range, an expanded search range is searched for a target virtual object, and a virtual object is controlled, according to a position of the target virtual object, to cast the target skill, so that when the user controls the first virtual object to use the target skill, the computer device can obtain a virtual object at a maximum shooting edge of the target skill, and cast the target skill on the obtained virtual object, which reduces user operations required in a process of using the skill to aim at such a virtual object, thereby improving the accuracy of casting the skill in the virtual scene and the interaction efficiency when the virtual object is controlled, and saving the computing resources consumed for processing the user operations and the computing resources consumed for casting the target skill in a virtual environment.

Figure 10:
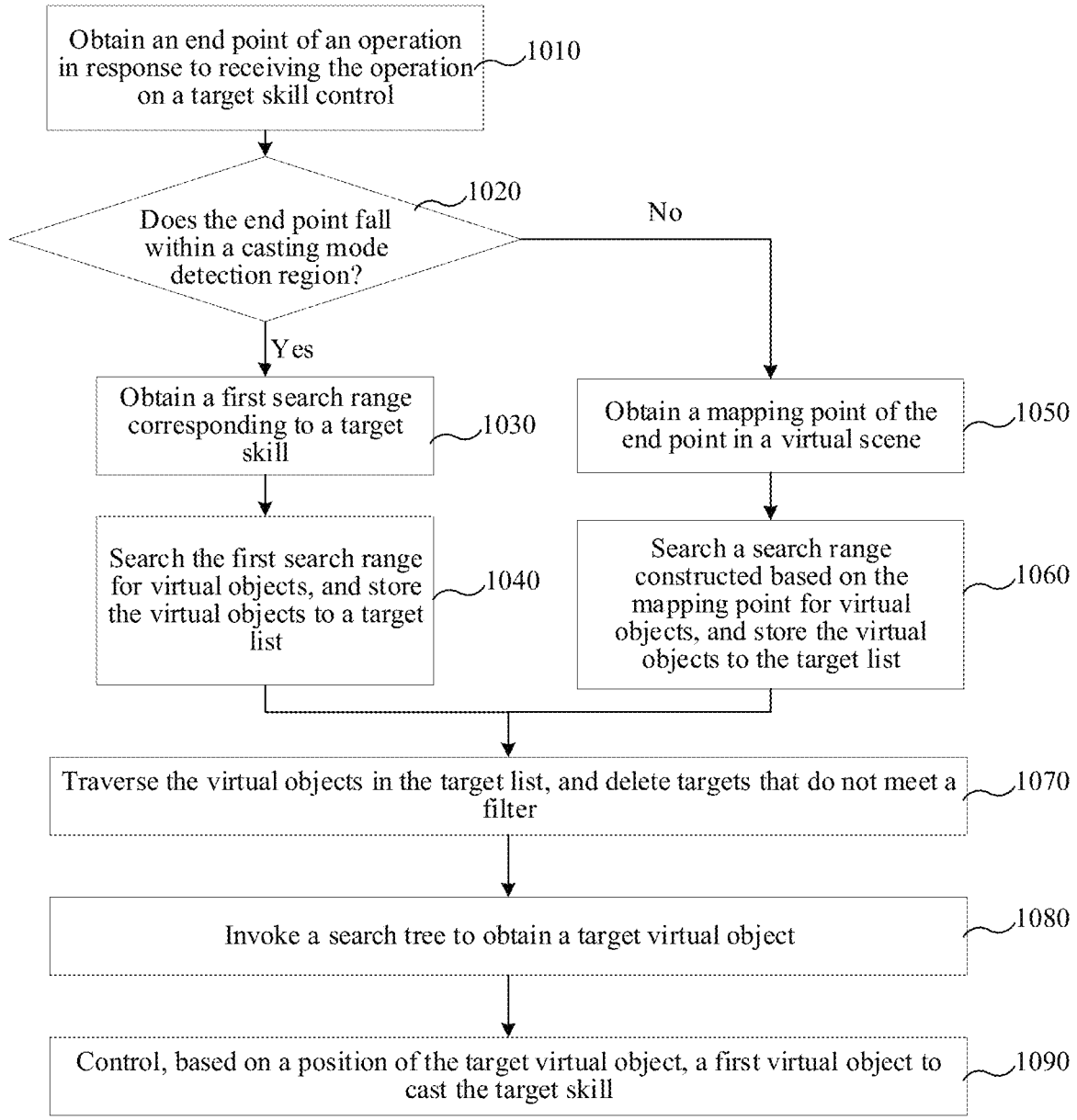
FIG. 10 is a flowchart of a virtual object control method in a virtual scene according to an exemplary embodiment of this disclosure.

The virtual object control method in a virtual scene provided in the embodiment of this disclosure shown in FIG. 3 or FIG. 4 is described by using an example in which the virtual scene is a game scene. FIG. 10 is a flowchart of a virtual object control method in a virtual scene according to an exemplary embodiment of this disclosure. The virtual object control method in a virtual scene may be performed by a computer device. The computer device may be implemented as a terminal or a server, where the terminal may be the terminal shown in FIG. 1, and the server may be the server shown in FIG. 1. As shown in FIG. 10, the virtual object control method in a virtual scene includes the following steps.

In Step 1010, an end point of an operation is determined in response to receiving the operation on a target skill control.

When running a game application program, the computer device presents a game scene, the game scene including a game screen and a UI. Various controls configured to control activities of the first virtual object in the game scene are presented on the UI, including the target skill control. The operation of the user on the target skill control may enable the first virtual object to use or cast a target skill associated with the target skill control in the game scene.

In one implementation, the determining an end point of the operation includes determining a distance and a direction of the end point of the operation compared to a starting point of the operation. In one implementation, the computer device further determines a starting point of the operation in response to receiving the operation on the target skill control. The starting point of the operation on the target skill control and the end point of the operation correspond to positions on a display screen of the computer device.

In Step 1020, whether the end point of the operation falls within a casting mode detection region is determined, and if yes, step 1030 is performed. Otherwise, step 1050 is performed.

The computer device may determine whether the end point of the operation falls within the casting mode detection region on the target skill control. A quick casting mode of the target skill is triggered when the end point of the operation falls within the casting mode detection region. An active aiming mode of the target skill is triggered when the end point of the operation is out of the casting mode detection region.

In Step 1030, a first search range in a virtual scene corresponding to a target skill is determined.

In Step 1040, the first search range is searched for virtual objects in the virtual scene, and the found virtual objects are stored to a target list.

The foregoing virtual object may be any virtual object within the first search range, for example, may be a virtual object on a camp the same as that of the first virtual object that casts the target skill, or may be a virtual object on a camp different from that of the first virtual object that casts the target skill.

In Step 1050, a mapping point of the end point of the operation in a virtual scene is determined.

In step 1050, the determining the mapping point of the end point of the operation in the virtual scene includes determining a distance and a relative direction between the mapping point and the first virtual object. Therefore, the determining a mapping point of the end point of the operation in the virtual scene may be implemented in the following steps.

First, determine a starting point DownPos of an operation at which the user press a target skill control, and drag an end point DragPos of the operation on the target skill control, a maximum drag range MaxDragRadius of a target skill button, a position HeroPos of a first virtual object in a virtual scene and a maximum shooting range SkillRange of the target skill.

Second, calculate a length (distance) between a mapping point in the virtual scene and the first virtual object according to a mapping relationship between an operation length of the user on the target skill control and a length in the virtual scene, the mapping relationship between the operation length of the user on the target skill control and the length in the virtual scene being shown in the following Formula 1:

$$|DragPos-DownPos|/MaxDragRadius=|FocusPoint-HeroPos|/SkillRange \quad \text{(Formula 1)}$$

FocusPoint is the mapping point of the end point of the operation in the virtual scene.

Third, calculate an orientation of the mapping point relative to the first virtual object.

In one implementation, the computer device maps a position of a screen center point (0, 0) to the virtual scene, to obtain a center mapping position ScreenCenter2SencePos, and then uses the screen center point (0, 0)+a position (DragPos−DownPos) to obtain a position ScreenDrag2ScenePos of the mapping point. An orientation from the position ScreenDrag2ScenePos to the position ScreenCenter2SencePos is an orientation of FocusPoint relative to HeroPos. Therefore, the determining a position of the mapping point in the virtual scene may be implemented by using the following Formula 2:

$$FocusPoint=HeroPos+(|DragPos-DownPos|/MaxDragRadius)*SkillRange*Normalize(ScreenDrag2ScenePos-ScreenCenter2SencePos) \quad \text{(Formula 2)}$$

In Step 1060, a search range constructed based on the mapping point for virtual objects in the virtual scene is searched, and the found virtual objects are stored to the target list.

In one implementation, the computer device may use some data as parameters to be transferred to a search function for searching. For example, the computer device may transfer parameters such as an identifier of the target skill, a parameter of the specified search range, and the position of the mapping point to the search function, to obtain virtual objects within a search range by using the position of the first virtual object in the virtual scene as a center and a sum of the shooting range of the target skill and the specified search range as a radius.

In Step 1070, the virtual objects in the target list are traversed, and virtual objects that do not meet a filter are deleted.

In one implementation, the filter is configured according to acting objects of different target skills.

In Step 1080, a search tree is invoked to obtain a target virtual object.

In Step 1090, based on a position of the target virtual object, a first virtual object is controlled to cast the target skill.

In summary, by using the virtual object control method in a virtual scene shown in the embodiments of this disclosure, when a target skill is cast, a maximum shooting range of the target skill is expanded by a specific search range, an expanded search range is searched for a target virtual object, and a virtual object is controlled, according to a position of the target virtual object, to cast the target skill, so that when the user controls the first virtual object to use the target skill, the computer device can obtain a virtual object at a maximum shooting edge of the target skill, and cast the target skill on the obtained virtual object, which reduces user operations required in a process of using the skill to aim at such a virtual object, thereby improving the accuracy of casting the skill in the virtual scene and the interaction efficiency when the virtual object is controlled, and saving the computing resources consumed for processing the user operations and the computing resources consumed for casting the target skill in a virtual environment.

Figure 11:
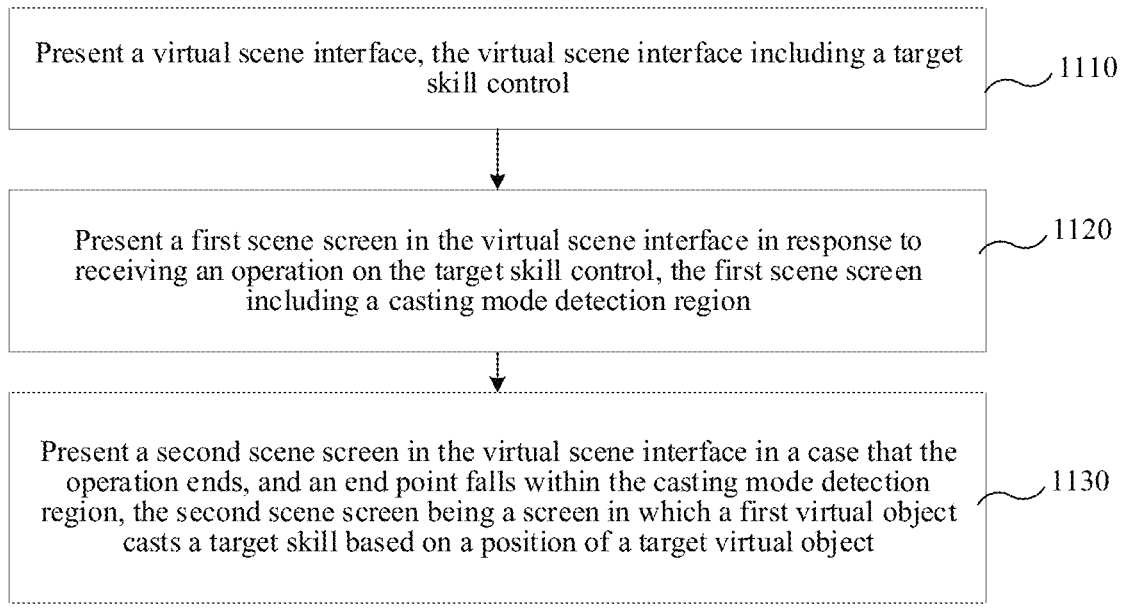
FIG. 11 is a flowchart of a virtual object control method in a virtual scene according to an exemplary embodiment of this disclosure.

FIG. 11 is a flowchart of a virtual object control method in a virtual scene according to an exemplary embodiment of this disclosure. The virtual object control method in a virtual scene may be performed by a terminal, where the terminal may be the terminal shown in FIG. 1. As shown in FIG. 11, the virtual object control method in a virtual scene includes the following steps.

In Step 1110, a virtual scene interface is presented, the virtual scene interface including a target skill control.

In one implementation, the virtual scene interface may include a screen obtained by observing the virtual scene and using the first virtual object as an observation center.

In Step 1120, a first scene screen is presented in the virtual scene interface in response to receiving an operation on the target skill control, the first scene screen including a casting mode detection region, the casting mode detection region being a region using a starting point of the operation as a center, the starting point of the operation being an operating point at which the operation starts.

In Step 1130, a second scene screen is presented in the virtual scene interface when the operation ends, and an end point of the operation falls within the casting mode detection region, the second scene screen being a screen in which a first virtual object casts a target skill based on a position of a target virtual object, the end point of the operation being an operating point at a previous time point of the end of the operation, the target virtual object being a virtual object within a first search region, the first search region being a region using the first virtual object as a center, and the first search region being greater than a maximum shooting range of the target skill.

In summary, by using the virtual object control method in a virtual scene shown in the embodiments of this disclosure, when a target skill is cast, a maximum shooting range of the target skill is expanded by a specific search range, an expanded search range is searched for a target virtual object, and a virtual object is controlled, according to a position of the target virtual object, to cast the target skill, so that when the user controls the first virtual object to use the target skill, the computer device can obtain a virtual object at a maximum shooting edge of the target skill, and cast the target skill on the obtained virtual object, which reduces user operations required in a process of using the skill to aim at such a virtual object, thereby improving the accuracy of casting the skill in the virtual scene and the interaction efficiency when the virtual object is controlled, and saving the computing resources consumed for processing the user operations and the computing resources consumed for casting the target skill in a virtual environment.

Figure 12:
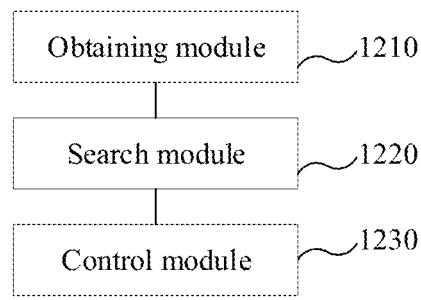
FIG. 12 is a block diagram of a virtual object control apparatus in a virtual scene according to an exemplary embodiment of this disclosure.

FIG. 12 is a block diagram of a virtual object control apparatus in a virtual scene according to an exemplary embodiment of this disclosure. The virtual object control apparatus in a virtual scene may be implemented as a part of the computer device by using software, hardware, or a combination of software and hardware to perform all or some steps in the virtual object control method in a virtual scene shown in FIG. 3, FIG. 6 or FIG. 11. The computer device may be implemented as a terminal or a server, where the terminal may be the terminal shown in FIG. 1, and the server may be the server shown in FIG. 1. As shown in FIG. 12, the virtual object control apparatus in a virtual scene includes an obtaining module 1210, a search module 1220, and a control module 1230. One or more of the modules of the apparatus can be implemented by processing circuitry, software, or a combination thereof, for example.

The obtaining module 1210 is configured to determine a first search range in a virtual scene corresponding to a target skill in response to receiving an operation on a target skill control, the first search range being greater than a maximum shooting range of the target skill in the virtual scene.

The search module 1220 is configured to search the first search range for a target virtual object in the virtual scene, the target virtual object being a virtual object actable on by the target skill.

The control module 1230 is configured to control, when the target virtual object is found within the first search range, and based on a position of the target virtual object in the virtual scene, a first virtual object to cast the target skill in the virtual scene.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In one implementation, the obtaining module 1210 includes a first obtaining submodule and a second obtaining submodule.

The first obtaining submodule is configured to determine the maximum shooting range of the target skill in the virtual scene in response to receiving the operation on the target skill control.

The second obtaining submodule is configured to expand the maximum shooting range by a specified search range, to obtain the first search range.

In one implementation, before the expanding the maximum shooting range by a specified search range, to obtain the first search range, the obtaining module 1210 further includes a third obtaining submodule and a first determining submodule.

The third obtaining submodule is configured to obtain an action radius of the target skill.

The first determining submodule is configured to determine a specified search range based on the action radius of the target skill.

In one implementation, before the expanding the maximum shooting range by a specified search range, to obtain the first search range, the obtaining module 1210 further includes a fourth obtaining submodule and a second determining module.

The fourth obtaining submodule is configured to obtain a skill casting type of the target skill, the skill casting type including: casting in a specified direction, or casting in a specified position.

The second determining submodule is configured to determine the specified search range based on the obtained skill casting type of the target skill.

In a possible implementation, the obtaining module 1210 includes a fifth obtaining submodule and a sixth obtaining submodule.

The fifth obtaining submodule is configured to determine a casting mode detection region corresponding to the operation in response to receiving the operation, the casting mode detection region being a region having a starting point of the operation as a center, the starting point of the operation being an operating point at which the operation starts.

The sixth obtaining submodule is configured to determine the first search range corresponding to the target skill when an end point of the operation falls within the casting mode detection region, the end point of the operation being an operating point at a previous time point of the end of the operation.

In one implementation, the sixth obtaining submodule includes a first obtaining unit and a second obtaining unit.

The first obtaining unit is configured to determine a position of the first virtual object in the virtual scene when the end point of the operation falls within the casting mode detection region.

The second obtaining unit is configured to determine, by using the position of the first virtual object in the virtual scene as a center, a region range obtained after the maximum shooting range is expanded by a specified search range as the first search range.

In one implementation, the target virtual object is a virtual object that is within the first search range and that meets a preset condition, the preset condition being set based on the target skill.

Further, the search module 1220 includes a third determining submodule and a search submodule.

The third determining submodule is configured to determine candidate virtual objects within the first search range based on the acting objects of the target skill.

The search submodule is configured to search the candidate virtual objects for the target virtual object based on the preset condition.

In one implementation, the search submodule includes a third obtaining unit, a sorting unit, and a fourth obtaining unit.

The third obtaining unit, configured to obtain target values corresponding to the candidate virtual objects based on the preset condition.

The sorting unit is configured to perform priority sorting on the candidate virtual objects according to the target values corresponding to the candidate virtual objects, to obtain a priority sorting result.

The fourth obtaining unit is configured to determine a candidate virtual object with a highest priority in the priority sorting result as the target virtual object.

In one implementation, when the skill casting type of the target skill is casting in a specified direction, the control module 1230 includes a seventh obtaining submodule and a first control submodule.

The seventh obtaining submodule is configured to determine a target direction of the target virtual object relative to the first virtual object in the virtual scene.

The first control submodule is configured to control the first virtual object to cast the target skill in the target direction.

In one implementation, when the skill casting type of the target skill is casting in a specified position, and the target virtual object is outside the maximum shooting range of the target skill, the control module 1230 includes an eighth obtaining submodule, a ninth obtaining submodule, and a second control submodule.

The eighth obtaining submodule is configured to determine a first position and a second position, the first position being a position of the first virtual object, the second position being the position of the target virtual object.

The ninth obtaining submodule is configured to determine an intersection of a connecting line between the first position and the second position and the maximum shooting range corresponding to the target skill.

The second control submodule is configured to control the first virtual object to cast the target skill on the intersection.

In one implementation, the apparatus further includes a cancel module configured to cancel the casting of the target skill when no target virtual object is within the first search range.

In summary, by using the virtual object control apparatus in a virtual scene shown in the embodiments of this disclosure, when a target skill is cast, a maximum shooting range of the target skill is expanded by a specific search range, an expanded search range is searched for a target virtual object, and a virtual object is controlled, according to a position of the target virtual object, to cast the target skill, so that when the user controls the first virtual object to use the target skill, the computer device can obtain a virtual object at a maximum shooting edge of the target skill, and cast the target skill on the obtained virtual object, which reduces user operations required in a process of using the skill to aim at such a virtual object, thereby improving the accuracy of casting the skill in the virtual scene and the interaction efficiency when the virtual object is controlled, and saving the computing resources consumed for processing the user operations and the computing resources consumed for casting the target skill in a virtual environment.

Figure 13:
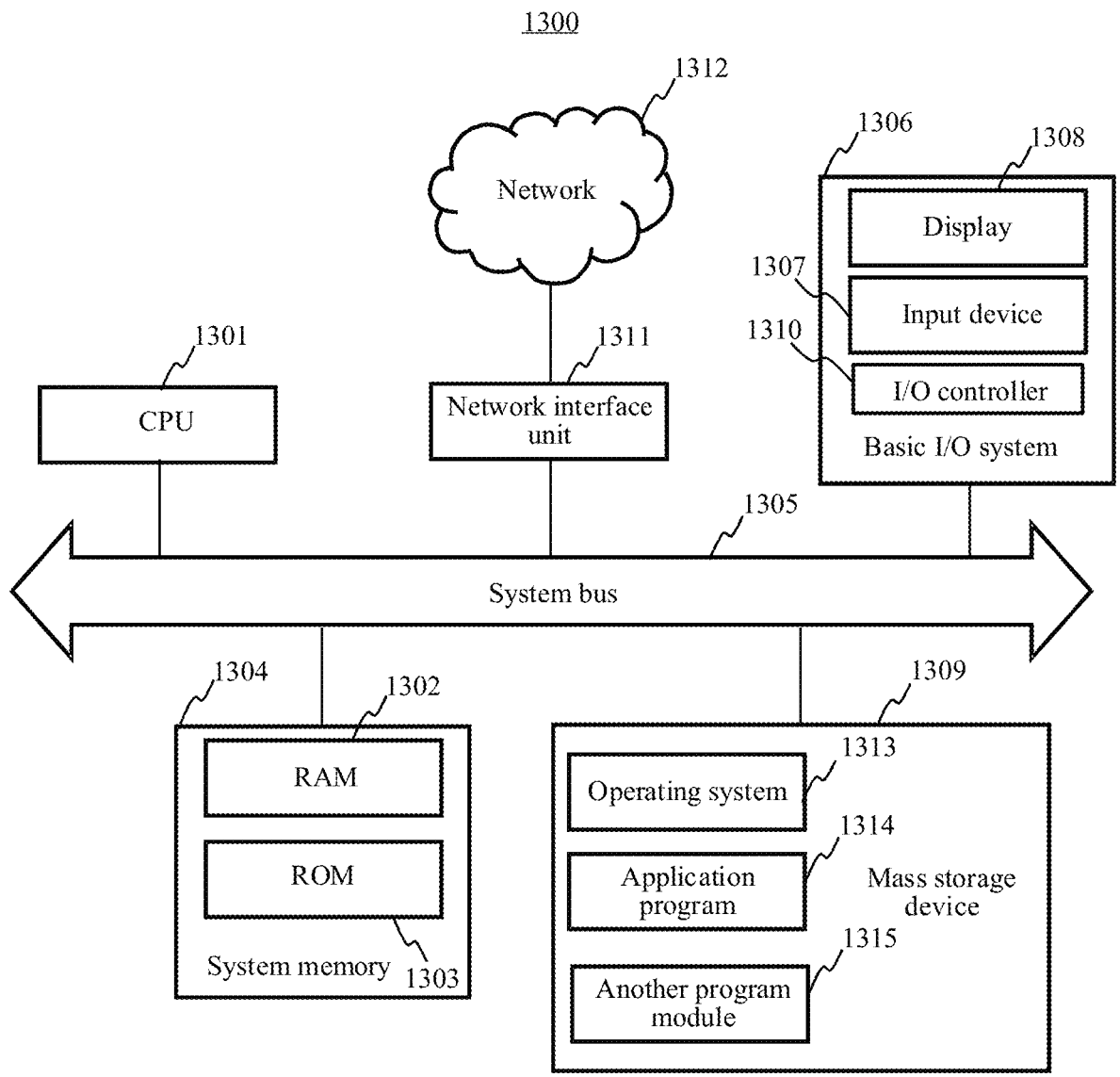
FIG. 13 is a structural block diagram of a computer device according to an exemplary embodiment.

FIG. 13 is a structural block diagram of a computer device 1300 according to an exemplary embodiment. The computer device 1300 includes a central processing unit (CPU) 1301, a system memory 1304 including a random access memory (RAM) 1302 and a read-only memory (ROM) 1303, and a system bus 1305 connecting the system memory 1304 to the CPU 1301. The computer device 1300 further includes a basic I/O system 1306 assisting in transmitting information between components in a computer, and a mass storage device 1309 configured to store an operating system 1313, an application program 1314, and another program module 1315.

The basic I/O system 1306 includes a display 1308 configured to display information and an input device 1307 such as a mouse or a keyboard for a user to input information. The monitor 1308 and the input device 1307 are both connected to the CPU 1301 by using an I/O controller 1310 connected to the system bus 1305.

According to the embodiments of this disclosure, the computer device 1300 may further be connected, through a network such as the Internet, to a remote computer on the network and run. That is, the computer device 1300 may be connected to a network 1312 by using a network interface unit 1311 connected to the system bus 1305, or may be connected to another type of network or a remote computer system (not shown) by using a network interface unit 1311.

The memory further includes one or more than one programs. The one or more than one programs are stored in the memory. The CPU 1301 executes the one or more than one programs to implement all or some steps in the method shown in the embodiments of this disclosure.

Figure 14:
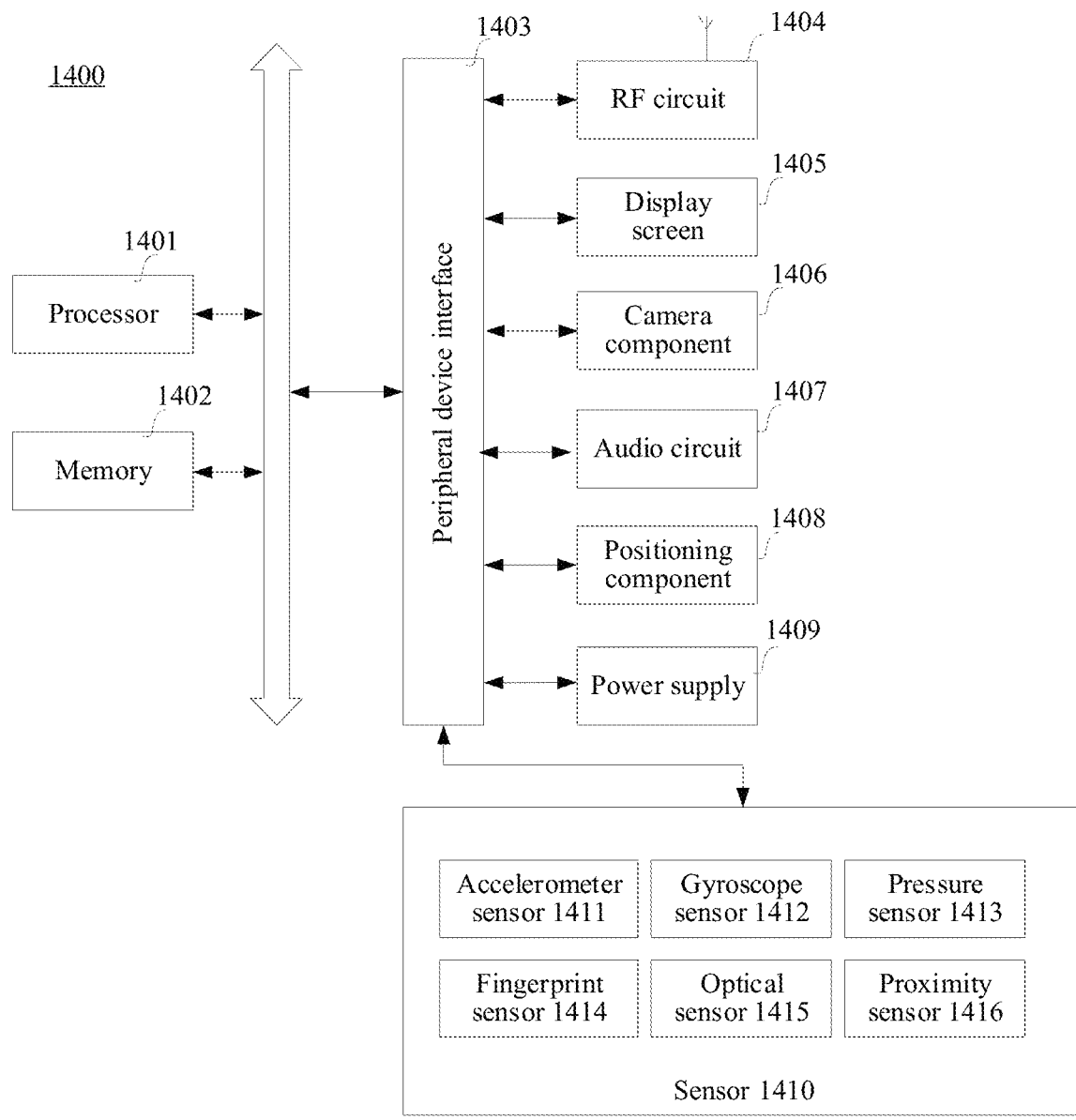
FIG. 14 is a structural block diagram of a computer device according to an exemplary embodiment.

FIG. 14 is a structural block diagram of a computer device 1400 according to an exemplary embodiment. The computer device 1400 may be the terminal shown in FIG. 1, for example, a smartphone, a tablet computer, or a desktop computer. The computer device 1400 may also be referred to as another name such as user equipment, a portable terminal, a laptop terminal, or a desktop terminal.

Generally, the computer device 1400 includes a processor 1401 and a memory 1402.

The processor 1401 may include one or more processing cores. The processor 1401 may alternatively include a main processor and a coprocessor. The main processor is configured to process data in an active state, also referred to as a CPU. The coprocessor is a low-power processor configured to process data in a standby state. In some embodiments, the processor 1401 may be integrated with a graphics processing unit (GPU). The GPU is configured to render and draw content that needs to be displayed on a display screen. In some embodiments, the processor 1401 may further include an artificial intelligence (AI) processor. The AI processor is configured to process computing operations related to machine learning.

The memory 1402 may include one or more computer-readable storage media. The computer-readable storage media may be non-transient. The memory 1402 may further include a high-speed RAM and a non-volatile memory, for example, one or more disk storage devices or flash memory devices. In some embodiments, a non-transitory computer-readable storage medium in the memory 1402 is configured to store at least one instruction, the at least one instruction being configured to be executed by the processor 1401 to implement the method provided in the method embodiments of this disclosure.

In some embodiments, the computer device 1400 further includes a peripheral device interface 1403 and at least one peripheral device. The processor 1401, the memory 1402, and the peripheral device interface 1403 may be connected by a bus or a signal cable. Each peripheral device may be connected to the peripheral device interface 1403 through a bus, a signal cable, or a circuit board. Specifically, the peripheral device includes at least one of a radio frequency (RF) circuit 1404, a touch display screen 1405, a camera component 1406, an audio circuit 1407, a positioning component 1408, and a power supply 1409.

The display screen 1405 is configured to display a UI. The UI may include a graphic, a text, an icon, a video, and any combination thereof. When the display screen 1405 is a touchscreen, the display screen 1405 is further capable of acquiring a touch signal on or above a surface of the display screen 1405. The touch signal may be inputted into the processor 1401 as a control signal for processing. In this case, the display screen 1405 may be further configured to provide a virtual button and/or a virtual keyboard, also referred to as a soft button and/or a soft keyboard.

The camera component 1406 is configured to acquire images or videos. In an embodiment, the camera component 1406 includes a front-facing camera and a rear-facing camera. Generally, the front-facing camera is disposed on a front panel of the terminal, and the rear-facing camera is disposed on a back surface of the terminal. In some embodiments, there are at least two rear-facing cameras, which are respectively any one of a main camera, a depth-of-field camera, a wide-angle camera, and a telephoto camera, to achieve background blurring function through fusion of the main camera and the depth-of-field camera, panoramic photographing and virtual reality (VR) photographing function through fusion of the main camera and the wide-angle camera, or other fusion photographing functions.

The audio circuit 1407 may include a microphone and a speaker. The microphone is configured to acquire sound waves of a user and an environment, and convert the sound waves into electrical signals and input the electrical signals into the processor 1401 for processing, or input the electrical signals into the RF circuit 1404 to implement voice communication.

In some embodiments, the computer device 1400 may further include one or more sensors 1410. The one or more sensors 1410 include, but are not limited to, an acceleration sensor 1411, a gyroscope sensor 1415, a pressure sensor 1413, a fingerprint sensor 1414, an optical sensor 1415, and a proximity sensor 1416.

A person skilled in the art may understand that the structure shown in FIG. 14 does not constitute any limitation on the computer device 1400, and the computer device may include more or fewer components than those shown in the figure, or some components may be combined, or a different component deployment may be used.

A person skilled in the art may understand that in the foregoing one or more examples, functions described in the embodiments of this disclosure may be implemented by using hardware, software, firmware, or any combination thereof. When implemented by using software, the functions can be stored in a computer-readable medium or can be used as one or more instructions or code in a computer-readable medium for transmission. The computer-readable medium includes a computer storage medium and a communications medium, where the communications medium includes any medium that enables a computer program to be transmitted from one place to another. The storage medium may be any available medium accessible to a general-purpose or dedicated computer.

An embodiment of this disclosure further provides a computer-readable storage medium, storing at least one instruction, at least one program, a code set, or an instruction set, and the at least one instruction, the at least one program, the code set, or the instruction set being loaded and executed by a processor to implement all or some steps in the foregoing virtual object control method in a virtual scene. For example, the computer readable storage medium may be a ROM, a RAM, a (compact disc ROM) CD-ROM, a magnetic tape, a floppy disk, or an optical data storage device.

An embodiment of this disclosure further provides a computer program product, storing at least one instruction, at least one program, a code set, or an instruction set, and the at least one instruction, the at least one program, the code set, or the instruction set being loaded and executed by a processor to implement all or some steps in the foregoing virtual object control method in a virtual scene shown in the foregoing embodiments.

It is to be understood that this disclosure is not limited to the precise structures described above and shown in the accompanying drawings, and various modifications and changes can be made without departing from the scope of this disclosure. The scope of this disclosure is limited by the appended claims only.

The invention claimed is:

1. A virtual object control method, comprising:
   determining, by processing circuitry, a first search range in a virtual scene corresponding to a target skill to be performed by a virtual object in a virtual environment of a game, in response to receiving an operation on a target skill control, the first search range being greater than a maximum casting range of the target skill in the virtual scene;
   searching the determined first search range for a target virtual object in the virtual scene, the target virtual object being a virtual object actable on by the target skill; and controlling, when the target virtual object is determined by the processing circuitry to be within the first search range and outside the maximum casting range of the target skill, a first virtual object to cast the target skill in the virtual scene within the maximum casting range based on a position of the target virtual object in the virtual scene.

2. The method according to claim 1, wherein the determining the first search range further comprises:
determining the maximum casting range of the target skill in the virtual scene, in response to receiving the operation on the target skill control; and
expanding the maximum casting range by a specified search range, to obtain the first search range.

3. The method according to claim 2, further comprising:
obtaining an action radius of the target skill; and
determining the specified search range based on the obtained action radius of the target skill.

4. The method according to claim 3, further comprising:
obtaining a skill casting type of the target skill, the skill casting type including one of casting in a specified direction and casting in a specified position; and
determining the specified search range based on the obtained skill casting type of the target skill.

5. The method according to claim 4, wherein when the skill casting type of the target skill is casting in the specified direction, the controlling further comprises:
determining a target direction of the target virtual object relative to the first virtual object in the virtual scene; and
controlling the first virtual object to cast the target skill in the target direction.

6. The method according to claim 4, wherein when the skill casting type of the target skill is casting in the specified position, and the target virtual object is outside the maximum casting range of the target skill, the controlling further comprises:
determining a first position and a second position, the first position being a position of the first virtual object, the second position being the position of the target virtual object;
determining an intersection of a connecting line between the determined first position and the determined second position and the maximum casting range corresponding to the target skill; and
controlling the first virtual object to cast the target skill on the determined intersection.

7. The method according to claim 1, wherein the determining the first search range further comprises:
determining a casting mode detection region corresponding to the operation, in response to receiving the operation, the casting mode detection region being a region having a starting point of the operation as a center, the starting point of the operation being an operating point at which the operation starts; and
determining the first search range corresponding to the target skill when an end point of the operation falls within the casting mode detection region, the end point of the operation being an operating point at a previous time point of the end of the operation.

8. The method according to claim 7, wherein the determining the first search range when the end point of the operation falls within the casting mode detection region further comprises:
determining a position of the first virtual object in the virtual scene when the end point of the operation falls within the casting mode detection region; and determining, by using the determined position of the first virtual object in the virtual scene as a center, a region range obtained after the maximum casting range is expanded by a specified search range as the first search range.

9. The method according to claim 1, wherein the target virtual object is a virtual object that is within the first search range and that meets a preset condition, the preset condition being set based on the target skill; and
the searching the determined first search range for the target virtual object in the virtual scene further comprises:
determining candidate virtual objects within the first search range based on acting objects of the target skill; and
searching the candidate virtual objects for the target virtual object based on the preset condition.

10. The method according to claim 9, wherein the searching the candidate virtual objects for the target virtual object further comprises:
obtaining target values corresponding to the candidate virtual objects based on the preset condition;
performing priority sorting on the candidate virtual objects according to the obtained target values corresponding to the candidate virtual objects, to obtain a priority sorting result; and
determining a particular candidate virtual object with a highest priority in the priority sorting result as the target virtual object.

11. The method according to claim 1, further comprising:
canceling the casting of the target skill when no target virtual object is within the determined first search range.

12. The method according to claim 1, wherein the controlling comprises:
controlling, when the target virtual object is determined by the processing circuitry to be within the first search range and outside the maximum casting range of the target skill, the first virtual object to cast the target skill in the virtual scene at the maximum casting range based on the position of the target virtual object in the virtual scene.

13. A virtual object control apparatus, comprising:
circuitry configured to:
determine a first search range in a virtual scene corresponding to a target skill to be performed by a virtual object in a virtual environment of a game, in response to receiving an operation on a target skill control, the first search range being greater than a maximum casting range of the target skill in the virtual scene;
search the determined first search range for a target virtual object in the virtual scene, the target virtual object being a virtual object actable on by the target skill; and
control, when the target virtual object is determined by the circuitry to be within the first search range and outside the maximum casting range of the target skill, a first virtual object to cast the target skill in the virtual scene within the maximum casting range based on a position of the target virtual object in the virtual scene.

14. The virtual object control apparatus of claim 13, wherein the circuitry, in the determining the first search range, is further configured to:

determine the maximum casting range of the target skill in the virtual scene, in response to receiving the operation on the target skill control; and expand the maximum casting range by a specified search range, to obtain the first search range.

15. The virtual object control apparatus of claim 14, wherein the circuitry is further configured to:

obtain an action radius of the target skill; and determine the specified search range based on the obtained action radius of the target skill.

16. The virtual object control apparatus of claim 15, wherein the circuitry is further configured to:

obtain a skill casting type of the target skill, the skill casting type including one of casting in a specified direction and casting in a specified position; and determine the specified search range based on the obtained skill casting type of the target skill.

17. The virtual object control apparatus of claim 16, wherein the circuitry is further configured to, when the skill casting type of the target skill is casting in the specified direction:

determine a target direction of the target virtual object relative to the first virtual object in the virtual scene; and control the first virtual object to cast the target skill in the target direction.

18. The virtual object control apparatus of claim 16, wherein the circuitry is further configured to, when the skill casting type of the target skill is casting in the specified position, and the target virtual object is outside the maximum sheeting casting range of the target skill:

determine a first position and a second position, the first position being a position of the first virtual object, the second position being the position of the target virtual object;

determine an intersection of a connecting line between the determined first position and the determined second position and the maximum casting range corresponding to the target skill; and control the first virtual object to cast the target skill on the determined intersection.

19. A non-transitory computer-readable storage medium, storing instructions which when executed by processing circuitry cause the processing circuitry to perform:

determining a first search range in a virtual scene corresponding to a target skill to be performed by a virtual object in a virtual environment of a game, in response to receiving an operation on a target skill control, the first search range being greater than a maximum casting range of the target skill in the virtual scene;

searching the determined first search range for a target virtual object in the virtual scene, the target virtual object being a virtual object actable on by the target skill; and controlling, when the target virtual object is determined by the processing circuitry to be within the first search range and outside the maximum casting range of the target skill, a first virtual object to cast the target skill in the virtual scene within the maximum casting range based on a position of the target virtual object in the virtual scene.

20. The non-transitory computer-readable storage medium according to claim 19, wherein the controlling comprises:

controlling, when the target virtual object is determined by the processing circuitry to be within the first search range and outside the maximum casting range of the target skill, the first virtual object to cast the target skill in the virtual scene at the maximum casting range based on the position of the target virtual object in the virtual scene.

* * * * *

UNITED STATES PATENT AND TRADEMARK OFFICE
CERTIFICATE OF CORRECTION

| | | |
|---|---|---|
| PATENT NO. | : 12,145,067 B2 | Page 1 of 1 |
| APPLICATION NO. | : 17/508436 | |
| DATED | : November 19, 2024 | |
| INVENTOR(S) | : Yulin Wan et al. | |

It is certified that error appears in the above-identified patent and that said Letters Patent is hereby corrected as shown below:

On the Title Page

Item (71), the Applicant city reads as:
Guangdong (CN)

Should read as:
--Shenzhen (CN)--

Signed and Sealed this
Twenty-fifth Day of February, 2025

Coke Morgan Stewart
*Acting Director of the United States Patent and Trademark Office*